3,240,732
LOW MOISTURE ABSORPTION INTERPOLYMERS OF CAPROLACTAM WITH 1 TO 10 MOLE PERCENT OF DIMER ACID AND DIAMINE
George E. Ham, Leawood, Kans., and James C. Werner, Henderson, Ky., assignors, by mesne assignments, to Gulf Oil Corporation, Pittsburgh, Pa., a corporation of Pennsylvania
No Drawing. Filed Jan. 11, 1961, Ser. No. 81,929
8 Claims. (Cl. 260—18)

This invention relates to polyamide to resinous materials.

Polyamide resins formed by polymerizing caprolactam monomer are used in many commercial articles. For certain uses it is important that the polyamide have high stiffness. However, polyamides from caprolactam absorb about 7 to 10% of their weight upon contact with water and a substantial but smaller amount upon contact with water vapor. For example, the amount of moisture absorbed when a specimen of polymerized caprolactam is placed in air having a relative humidity of 65%, before equilibrium is reached, is about 2 to 3% of the weight of the specimen. As a result of moisture absorption the stiffness, as well as abrasion resistance and tensile strength, are reduced. These are definite disadvantages because many uses require that such properties be maintained high or within narrow ranges, i.e., constant.

In addition, it is important that electrical insulation sheathing of these materials maintain a low moisture content even upon contact with water or water vapor.

Because of the ability of polymers of caprolactam to gain and lose moisture, it is common practice to place molded articles thereof in water so as to absorb as much water as possible. This is done in order to obtain dimensional stability of the molded article by avoiding dimensional change through variable moisture content. Not only is this an additional step and expense, but it is unsatisfactory where low moisture content is needed in conjunction with dimensional stability. Furthermore, after such articles are placed in an atmosphere of low relative humidity and high temperature for a prolonged period of time, they lose much of their moisture and dimensional change results.

According to the present invention there are provided novel interpolymers of caprolactam with an aliphatic dicarboxylic acid containing at least 32, and advisably not more than 44, carbon atoms and an aliphatic diamine, an aromatic containing diamine, or a heterocyclic diamine having one or both nitrogens in a ring, and processes of producing such interpolymers. These interpolymers are characterized by an exceedingly low moisture absorption capacity, compared to polycaprolactam, but yet have stiffness and tensile properties comparable to polycaprolactam.

Some of the aliphatic dicarboxylic acids having over 32 carbon atoms which can be used are dioleic acid, dilinoleic acid, dilinolenic acid, dierucic acid, divaccenic acid, dibrassidic acid, diisoleic acid, diisoerucic acid, dicetoleic acid and dipetroselic acid. Such acids are formed by a dimerization of the appropriate unsaturated long chain acids in which two molecules of the acid are joined together by a bond between a formerly unsaturated carbon of each molecule. The resulting acids are branched chain dicarboxylic acids. These unsaturated dicarboxylic acids may also be hydrogenated to form fully saturated acids which can also be used in the practice of this invention.

Representative of the diamines which can be used in the process are aliphatic diamines such as ethylenediamine, trimethylenediamine, tetramethylenediamine and hexamethylenediamine, and advisably such aliphatic diamines having alpha, omega-diamines, and up to twelve carbons, an aromatic containing diamine such as m-xylylenediamine, and heterocyclic diamines such as piperazine and 2,5-dimethylpiperazine.

The interpolymers provided by this invention are advisably produced using an equivalent amount of about 1.0 to 10.0 mole percent and particularly 1.0 to 5.0, and advisably 1.0 to 2.5, mole percent, based on the interpolymer, of each of the diamine and the dicarboxylic acid.

It is undesirable in producing the interpolymer to use an amount of the dicarboxylic acid in substantial excess of the molar equivalent of diamine used. This is because substantial excess acid terminates the polymer chain and a brittle polymer is produced. Best results are generally achieved by the use of substantially equimolar amounts of dicarboxylic acid and a diamine.

Reaction between the caprolactam, diamine and dicarboxylic acid can be readily achieved by bringing the reactants together in admixed form and heating to an elevated temperature such as from about 190° C. to 300° C. and advisably in the absence of oxygen. An inert gas such as nitrogen can be used to exclude air and remove water of condensation. It is preferable to bubble the gas through the reaction mixture since this facilitates removal of the water of condensation. After heating at an elevated temperature for a sufficient time to complete the interpolymerization, which is generally completed in 4–24 hours, the mixture can be cooled, the solid interpolymer removed from the reactor, washed with water and dried. The interpolymer can then be cut into chips, if desired, to facilitate handling and molding operations.

The interpolymers can also be produced by first forming a salt of the dicarboxylic acid with the diamine and then reacting the salt with the caprolactam to give the product. The salt can be readily formed by reacting the dicarboxylic acid and diamine in a suitable solvent, such as an alcohol-water mixture, from which the salt precipitates. The caprolactam can then be combined with the salt and the mixture heated to form the interpolymer.

The following examples are presented to illustrate the invention.

EXAMPLE 1

Caprolactam in the presence of 1.7 mole percent each of ethylenediamine and dilinoleic acid, based on the interpolymer, was heated at about 255° C. for 24 hours in a reactor under a cover of nitrogen. The resulting interpolymer was removed from the reactor and cut into chips. The resin was then washed at about 90 to 95° C. with demineralized water and dried. The resin was then ready for molding into a desired object.

EXAMPLE 2

Various combinations of caprolactam, dicarboxylic acids and diamines were interpolymerized using the amounts given in Table 1 and following the procedures of Example 1. The flexural stiffness, tensile impact and moisture pick-up for each of the interpolymers, compared to the values for polycaprolactam, are also given in Table 1.

*Table 1*

| Caprolactam, Mole percent | Dilinoleic Acid, Mole percent | Diamine Cpd.[1], percent | Stiffness in Flexure, p.s.i.[2] | Tensile Strength, p.s.i.[2] | Moisture Pick-up, percent[3] | Moisture Equilibrium at 5% R.H., percent |
|---|---|---|---|---|---|---|
| 96.6 | 1.7 | H1.7 | 80,000 | 8,900 | 5.4 | 2.6 |
| 90.0 | 5.0 | H5.0 | 54,000 | 7,000 | 2.0 | 1.8 |
| 80.0 | 10.0 | H10.0 | 36,000 | 4,400 | 2.0 | 1.5 |
| 96.6 | 1.7 | T1.7 | 70,000 | 10,000 | 6.0 | 1.7 |
| 90.0 | 5.0 | T5.0 | 50,000 | 7,500 | 3.5 | 2.0 |
| 96.6 | 1.7 | E1.7 | 97,000 | 10,900 | 6.5 | 3.0 |
| 90.0 | 5.0 | E5.0 | 52,000 | 6,000 | 5.8 | 1.9 |
| 96.6 | 1.7 | X1.7 | 104,000 | 14,500 | [4]2.7 | 1.5 |
| 100 | — | — | 85,000 | 14,000 | 6.8 | 2.5 |

[1] H=hexamethylenediamine; T=tetramethylenediamine; E=ethylenediamine; X=m-xylylenediamine.
[2] Conditioned at 5% relative humidity for two weeks.
[3] Immersed in water at ambient temperature for two weeks.
[4] Immersed 4 days. Test specimens were dried at 100° C. in a vacuum oven before and after immersion.

Various changes and modifications of the invention can be made, and to the extent that such variations incorporate the spirit of this invention, they are intended to be included within the scope of the appended claims.

What is claimed is:

1. A low moisture absorption interpolymer of caprolactam, a dicarboxylic acid having 32 to 44 carbons and a diamine interpolymerized together simultaneously, said acid and said diamine each being present in from 1 to 10 mole percent based on the interpolymer, with said diamine being selected from the class consisting of m-xylylenediamine and alpha-omega aliphatic diamines containing up to 12 carbon atoms, and with said dicarboxylic acid being a dimer of unsaturated monocarboxylic acids.

2. An interpolymer according to claim 1 containing equal mole percents of the dicarboxylic acid and diamine.

3. A low moisture absorption interpolymer of caprolactam, dilinoleic acid and hexamethylenediamine interpolymerized together simultaneously, said acid and said diamine each being present in from 1 to 10 mole percents based on the interpolymer.

4. A low moisture absorption interpolymer of caprolactam, dilinoleic acid and tetramethylenediamine interpolymerized together simultaneously, said acid and said diamine each being present in from 1 to 10 mole percents based on the interpolymer.

5. A low moisture absorption interpolymer of caprolactam, dilinoleic acid and ethylenediamine interpolymerized together simultaneously, said acid and said diamine each being present in from 1 to 10 mole percents based on the interpolymer.

6. A low moisture absorption interpolymer of caprolactam, dilinoleic acid and m-xylylenediamine interpolymerized together simultaneously, said acid and said diamine each being present in from 1 to 10 mole percent based on the interpolymer.

7. A low moisture absorption interpolymer of caprolactam, a dicarboxylic acid formed by dimerization of unsaturated monocarboxylic acids and having 32 to 44 carbons and an alpha-omega aliphatic diamine having 4 to 12 carbons with the amines located in the alpha and omega positions, said caprolactam, dicarboxylic acid and diamine being interpolymerized together simultaneously, with said acid and diamine each being present in from 1 to 10 mole percents based on the interpolymer.

8. A low moisture absorption interpolymer of caprolactam, an unsaturated dicarboxylic acid having 32 to 44 carbons and a diamine interpolymerized together simultaneously, said acid and diamine each being present in from about 1.0 to about 10 mole percent based on the interpolymer, with said dicarboxylic acid being a dimer of unsaturated monocarboxylic acids containing more than one unsaturated bond with said dimer having a portion of its unsaturated bonds hydrogenated to saturated bonds, and with said diamine selected from the class consisting of m-xylylenediamine and alpha-omega aliphatic diamines containing up to 12 carbon atoms.

References Cited by the Examiner

UNITED STATES PATENTS

| 2,555,111 | 5/1951 | Bradley | 260—18 |
| 2,562,796 | 7/1951 | Koch | 260—78 |
| 2,646,413 | 7/1953 | Taylor | 260—78 |
| 2,756,257 | 7/1956 | Stamatoff | 260—78 |
| 2,893,980 | 7/1959 | Ham et al. | 260—78 |
| 2,927,906 | 3/1960 | Schlack et al. | 260—78 |

OTHER REFERENCES

Majury: "Journal of Polymer Science," vol. XXXI (1958), pages 383–397.

LEON J. BERCOVITZ, *Primary Examiner.*

A. D. SULLIVAN, *Examiner.*